July 8, 1952        G. A. TINNERMAN        2,602,209
FASTENING DEVICE
Original Filed Aug. 12, 1948
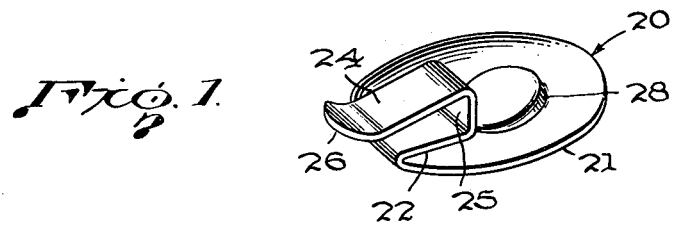
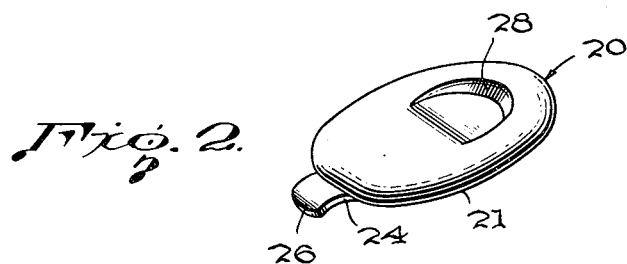
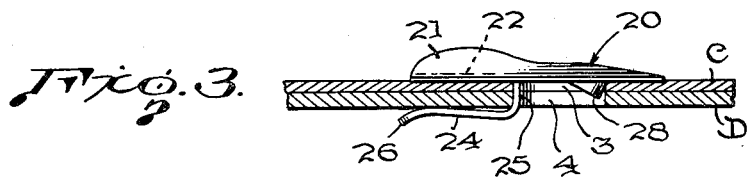
INVENTOR.
GEORGE A. TINNERMAN
BY
*H. I. Lombard*
ATTORNEY Patented July 8, 1952

2,602,209

UNITED STATES PATENT OFFICE 2,602,209

FASTENING DEVICE

George A. Tinnerman, Cleveland, Ohio, assignor to Tinnerman Products, Inc., Cleveland, Ohio, a corporation of Ohio Original application August 12, 1948, Serial No. 43,811, now Patent No. 2,542,883, dated February 20, 1951. Divided and this application December 28, 1950, Serial No. 203,181

1 Claim. (Cl. 24—259)

This invention relates in general to fastening devices and deals, more particularly, with fastening devices in the form of clips, or the like, which are adapted to be attached in aligned openings in two or more parts to secure the same together. This application is a division of prior copending application Serial Number 43,811, filed August 12, 1948, and issued as U. S. Patent Number 2,542,883 on February 20, 1951.

Frequently the attaching opening for a clip or similar fastener is exposed on the outer side of the installation and there is, therefore, a tendency for water, dust and other foreign matter to pass through the attaching opening into the interior of the assembly. In automobile installations, for example, this is highly objectionable inasmuch as the entrance of such water, dust and other foreign matter into the interior of the vehicle body results in damage to the upholstery, trim material, etc.

A primary object of the invention, therefore, is to provide an improved fastener in the form of a clip in which the attaching means is provided in conjunction with an imperforate button-like head that completely covers and closes the attaching opening for the fastener and thereby prevents the passage of water, dust and other foreign matter through such attaching opening.

A further object of the invention is to provide an improved clip fastener having such an imperforate button-type head by which the attaching opening for the fastener is rendered impervious to the passage of water, dust and other foreign matter, and in which the attaching means of the fastener is so designed as to be easily and quickly slid into applied position in interlocked engagement in aligned openings in the parts secured.

Another object of the invention is for the provision of an improved fastener comprising an imperforate button-like head adapted for leak-proof and dust-proof attachment over an attaching opening in parts to be secured, and attaching means in the form of a hook, or the like, which is easily and quickly secured in the attaching opening together with a cooperating locking shoulder on the head of the fastener which locks the fastener in attached position against loosening or removal.

Further objects and advantages, and other new and useful features in the construction, arrangement and general combination of parts of the invention will be readily apparent as the following description proceeds with reference to the accompanying drawings, for purposes of illustration, but not of limitation, in which like reference characters designate like parts throughout, and in which:

Fig. 1 is a perspective view of a fastener in accordance with the invention as seen from the underside thereof;

Fig. 2 is a perspective of the top of the fastener of Fig. 1 showing the imperforate button-like head thereof; and, Fig. 3 is a sectional view showing the fastener of Figs. 1 and 2 as applied to a work opening defined by aligned holes in a pair of superposed parts to be secured.

The improved fastening device of the invention is one of general utility and may be readily provided in any size or form in proportion to the size and contour of the parts secured. The fastening device is particularly suited for use in securing a part to an apertured supporting part by a simple and quick operation taking place entirely from one side thereof as is required in a blind location, for example. In general, the fastener comprises an imperforate button-like head which completely covers the aligned openings in the parts secured and attaching means in the form of a hook, or the like, which is applied easily and quickly through such aligned openings to secure said parts by a clasping action together with a locking shoulder on the head of the fastener which locks the fastener in applied fastening position against loosening or displacement. The imperforate button-like head of the fastener serves not only to close the aligned openings in the parts secured against the passage of moisture, dust and other foreign matter but also presents a smooth, rounded surface which provides for safety and a neat and pleasing appearance.

Referring now, more particularly, to the drawings, the fastener shown in Figs. 1 and 2 is illustrated in Fig. 3 in a typical application for securing a part C to a supporting part D through aligned holes 3, 4, respectively, provided in said parts. The supporting part D may be of any suitable material, such as sheet metal, wood or fiber board, or the like, but usually is in the form of a metallic plate or panel member. The aligned holes 3, 4, respectively, are usually in the form of circular perforations but, of course, may be provided in any suitable configuration in the manner of elongate slots, or the like.

The clip or fastener, designated generally 20, is formed from a relatively small, inexpensive blank of sheet metal which is readily severed from standard sheet metal strip stock with a minimum loss or waste of material. The fastener may be made of any suitable sheet metal but preferably that of a spring metal nature such as spring steel or cold rolled metal having spring characteristics and otherwise of much greater tensile and compressive strength than the parts C, D secured thereby. The fastener is provided with a base or body 21 of any desired shape or design in the form of an imperforate button-like head. Preferably the fastener body or base 21 is formed in the stamping operation in a generally concave, dished formation together with an integral strip at one end which is return bent to provide a spring arm portion 22 under the fastener base or body 21 and within the concave interior thereof together with an outwardly bent portion providing the attaching hook or tongue 24. The hook 24, as thus provided, defines a shoulder 25 adjoining the spring arm portion 22, and a clasping portion spaced therefrom, in normal untensioned relation, a distance slightly less than the combined thickness of the parts C, D to be secured. Preferably the extremity or free end of said hook 24 terminates in an outwardly flared lip 26 which extends slightly beyond the periphery of the fastener base or body 21 and which facilitates the initial application of said hook 24 over the marginal edge of the aligned holes 3, 4, at the underside of the assembled parts C, D.

An imperforate depression is formed directly in the fastener base or body 21 to provide a pronounced shoulder 28 projecting from the underside thereof which is spaced from the shoulder 25 a distance substantially equal to or slightly less than the space between opposing wall portions of the aligned holes 3, 4, in the parts secured. The aligned holes 3, 4, usually define a circular opening and accordingly, the shoulder 28 is provided in a rounded formation corresponding to the contour of such a circular opening so as to be received therein in snug engagement with the adjacent wall thereof.

With the clip or fastener 20 thus provided and the parts C, D, to be secured prepared with the holes 3, 4, respectively, in suitable registration as shown in Fig. 3, the fastener is easily and quickly applied to locked fastening position securing said parts by an operation taking place entirely from the outer, readily accessible side of the assembly. This is effected simply by inserting the free end of the resilient hook 24 into and through the aligned holes 3, 4, and sliding the fastener in the direction of the free end of said hook 24. The outwardly flared lip 26 on the extremity of said hook 24 facilitates this initial step in applying the hook 24 by causing a gradual outward flexing thereof relatively to the associated spring arm 22 as it cams over the edge of the hole 4 at the underside of the assembly. By pressing on the base or body 21 of the fastener and simultaneously sliding the fastener forward, the clasping portion of said hook 24 clears the underside of the supporting part D and permits the fastener to be advanced to its fully applied fastening position to the point at which the shoulder 25 on said hook abuts the adjacent wall of the aligned holes 3, 4. In this position, the pronounced shoulder 28 on the fastener body or base 21 snaps into the opening 3 of the part C in engagement with the adjacent wall thereof in directly opposed relation to the shoulder 25, inasmuch as it is provided in a predetermined spacing from said shoulder 25 for this purpose in order to cooperate therewith and lock the fastener in fully applied fastening position. Said shoulder 28, accordingly, cooperates with the shoulder 25 on the hook in engaging opposing wall portions of the aligned openings 3, 4, to prevent endwise displacement or shifting of the fastener from applied position. In this relation, the hook 24 is in rigid, clasping engagement with the underside of part C and cooperates with the spring arm 22 and fastener body 21 to fasten the secured parts C, D, under continuously effective spring tension. In the application of the fastener, the fastener body or base 21 flexes and yields slightly as the hook 24 is advanced to its final position in which said fastener body or base 21 is disposed in close, substantially flush relation to the outer surface of the secured part C under continuously effective spring tension. The arrangement is such that the smooth rounded formation of the fastener body or base 21 defines a blunt, button-like protuberance on the exposed surface of the assembly for safety purposes and presents a neat and pleasing appearance while otherwise covering and closing the aligned holes 3, 4, against the passage of moisture, dust and other foreign matter.

In the event that it is necessary or desirable to remove the fastener from attached fastening position, a suitable tool is employed to wedge the fastener body or base 21 from the adjacent surface of part C as necessary to displace the shoulder 28 on said fastener base from abutting relation with the engaged wall portion of the opening 3, whereupon the fastener may be slid reversely to disengage the attaching hook 24 from fastening position in the aligned holes 3, 4 and thereby permit the fastener to be removed.

While the invention has been described in detail with a specific example, such example is intended as an illustration only inasmuch as it will be apparent that other modifications in the construction, arrangement and general combination of parts may be devised without departing from the spirit and scope of the invention.

What is claimed is:

A fastener adapted to be secured in a work opening comprising a sheet metal body providing a generally concave imperforate base for covering and closing said opening, an arm integrally connected to the peripheral edge of said imperforate base and extending inwardly under said generally concave base, said arm having a return bend providing an outwardly extending hook projecting outwardly out of the plane of said arm in position to be received in a work opening in clasping relation with the work adjacent said opening in the attached position of the fastener, an outwardly flared lip on the extremity of said hook for facilitating the application of said hook in said opening, said base having a depression located entirely within the periphery of said base and defining a shoulder projecting from the underside of said base and also receivable in said work opening to retain said hook in the work opening in said attached position of the fastener.

GEORGE A. TINNERMAN.

REFERENCES CITED

The following references are of record in the file of this patent:

UNITED STATES PATENTS

| Number | Name | Date |
|---|---|---|
| 685,307 | Stowell | Oct. 29, 1901 |
| 1,797,091 | Kapp et al. | Mar. 17, 1931 |
| 2,150,497 | Fernberg | Mar. 14, 1939 |